(12) United States Patent
Chiba et al.

(10) Patent No.: US 10,723,209 B2
(45) Date of Patent: Jul. 28, 2020

(54) RESIN BACK DOOR FOR VEHICLE AND METHOD OF MANUFACTURING THE SAME

(71) Applicants: TOYOTA JIDOSHA KABUSHIKI KAISHA, Toyota-shi, Aichi-ken (JP); TOYOTA JIDOSHA KYUSHU KABUSHIKI KAISHA, Miyawaka-shi, Fukuoka-ken (JP)

(72) Inventors: Kenji Chiba, Tokai (JP); Takayuki Okubo, Toyota (JP); Kiyokazu Nitta, Miyoshi (JP); Keigo Nakamura, Munakata (JP); Yoshito Fujimoto, Kitakyushu (JP); Yuuki Katou, Munakata (JP)

(73) Assignees: TOYOTA JIDOSHA KABUSHIKI KAISHA, Toyota (JP); TOYOTA JIDOSHA KYUSHU KABUSHIKI KAISHA, Miyawaka-shi (JP)

( * ) Notice: Subject to any disclaimer, the term of this patent is extended or adjusted under 35 U.S.C. 154(b) by 33 days.

(21) Appl. No.: 16/225,558

(22) Filed: Dec. 19, 2018

(65) Prior Publication Data

US 2019/0184798 A1  Jun. 20, 2019

(30) Foreign Application Priority Data

Dec. 19, 2017  (JP) ................................. 2017-242332

(51) Int. Cl.
*B60J 5/10* (2006.01)
*B62D 25/08* (2006.01)
(Continued)

(52) U.S. Cl.
CPC ............. *B60J 5/107* (2013.01); *B60J 5/0481* (2013.01); *B60J 5/101* (2013.01); *B60J 5/102* (2013.01); *B62D 25/08* (2013.01); *B62D 27/026* (2013.01)

(58) Field of Classification Search
CPC . B60J 5/107; B60J 5/101; B60J 5/0481; B60J 5/102; B62D 27/026; B62D 25/08
(Continued)

(56) References Cited

U.S. PATENT DOCUMENTS 4,822,098 A * 4/1989 Vogt ........................ B60J 5/101
  296/146.5
7,681,940 B2 * 3/2010 Brown ..................... B60J 5/101
  296/146.6
(Continued)

FOREIGN PATENT DOCUMENTS

JP   2010-247676 A   11/2010
JP   2011-126388 A    6/2011

*Primary Examiner* — Pinel E Romain
(74) *Attorney, Agent, or Firm* — Oliff PLC

(57) ABSTRACT

A resin back door includes a resin inner panel, a resin lower outer panel, and a metal reinforcing member disposed in a hollow space defined by the inner panel and the lower outer panel. In the resin back door, the reinforcing member has an annular shape extending along an outer peripheral edge of the inner panel, and includes right and left reinforcing members and a lower-side reinforcing member which are separated from each other and fixed to the inner panel with an adhesive leaving a gap. The reinforcing members are connected by using right and left corner connecting members and an upper connecting member to constitute the reinforcing member.

5 Claims, 9 Drawing Sheets

(51) Int. Cl.
*B62D 27/02* (2006.01)
*B60J 5/04* (2006.01)

(58) Field of Classification Search
USPC .................................................. 296/146.8
See application file for complete search history.

(56) References Cited

U.S. PATENT DOCUMENTS

| | | | | |
|---|---|---|---|---|
| 8,403,399 | B2 * | 3/2013 | Kuntze | B60J 5/107 |
| | | | | 296/146.6 |
| 8,550,536 | B2 * | 10/2013 | Gachter | B60J 5/107 |
| | | | | 296/146.8 |
| 9,499,032 | B2 * | 11/2016 | Ikeda | B60J 5/101 |
| 9,981,534 | B2 * | 5/2018 | Dassen | B60J 5/107 |
| 10,449,841 | B2 * | 10/2019 | Ikeda | B62D 29/043 |
| 2015/0291016 | A1 * | 10/2015 | Kato | B60J 5/101 |
| | | | | 49/501 |

* cited by examiner

RESIN BACK DOOR FOR VEHICLE AND METHOD OF MANUFACTURING THE SAME

CROSS REFERENCE TO RELATED APPLICATION

The disclosure of Japanese Patent Application No. 2017-242332 filed on Dec. 19, 2017 including the specification, claims, drawings, and abstract is incorporated herein by reference in its entirety.

TECHNICAL FIELD

The present disclosure relates to a structure of a resin back door for a vehicle including a resin inner panel, a resin outer panel, and a metal reinforcing member, and to a method of manufacturing the same.

BACKGROUND

In recent years, many vehicle doors made of resin have been used. The doors made of resin have a reduced weight but, as compared with that of doors made from steel plate, ensuring rigidity is difficult. For this reason, there have been proposed metal reinforcing members, each of which is attached in a hollow space defined between a resin inner panel and a resin outer panel (e.g., see JP 2011-126388 A).

In JP 2011-126388 A, there is described a structure of a back door in which a metal reinforcing member is fixed to a resin inner panel with screws (e.g., see paragraph 0008, FIG. 11, paragraph 0035, and FIG. 5 of JP 2011-126388 A).

SUMMARY

Meanwhile, a resin inner panel, an outer panel, and a metal reinforcing member have dimensional variations. For this reason, as described in JP 2011-126388 A, when a metal reinforcing member having high rigidity is fastened to a resin inner panel having low rigidity with screws or the like, due to dimensional variation, the resin inner panel is sometimes deformed in order to conform to the shape of the metal reinforcing member having high rigidity, resulting in deformation of the outer peripheral shape of the inner panel. This deformation may lead to a gap width difference between a design surface of a body and right and left outer circumferences of a back door or to a level difference between the design surface of the body and a design surface of the back door.

Therefore, an object of the present disclosure is to improve external dimensional accuracy of a resin back door while ensuring the strength of the resin back door.

Solution to Problem

A resin back door for a vehicle according to the present disclosure includes a resin inner panel, a resin outer panel, and a metal reinforcing member. The metal reinforcing member is disposed in a hollow space defined by the inner panel and the outer panel. In the resin back door, the reinforcing member has an annular shape extending along an outer peripheral edge of the inner panel, and includes a plurality of divided reinforcing members separated from each other and fixed to the inner panel with an adhesive leaving a gap. The reinforcing member is constituted by connecting the divided reinforcing members via connecting members.

The dimensional variation of the reinforcing member and the dimensional variation of the inner panel are accommodated by the gap so that the reinforcing member is fixedly bonded to the inner panel. Therefore, the reinforcing member is prevented from deforming the inner panel during assembly, and the external dimensional accuracy of the resin back door can be improved while ensuring the strength of the resin back door. In addition, the reinforcing member of annular shape is formed by connecting the divided reinforcing members via the connecting members, and the entire peripheral edge of the inner panel is covered by the reinforcing member. Thus, deformation of the resin back door for a vehicle due to external factors, such as heat or external force, can be suppressed.

In the resin back door for a vehicle, the divided reinforcing members and the connecting members are fastened with fasteners, and a fastener hole defined between each of the divided reinforcing members and each of the connecting members may have a size large enough to accommodate a variation in distance between divided reinforcing members. Therefore, the inner panel is not deformed when the connecting member is fastened, and it is possible to improve external dimensional accuracy while ensuring the strength of the resin back door for a vehicle.

In the resin back door for a vehicle, the divided reinforcing member includes a left reinforcing member of substantially L-shape form disposed along an upper side portion, a left side portion, and a lower left portion of the inner panel and including an upper left shoulder portion opposed to the upper side portion and a lower left arm portion opposed to the lower left portion, a right reinforcing member of substantially L-shape form disposed along the upper side portion, a right side portion, and a lower right portion of the inner panel and including an upper right shoulder portion opposed to the upper side portion and a lower right arm portion opposed to the lower right portion, and a lower-side reinforcing member disposed at a lower side portion of the inner panel. The connecting member may include an upper connecting member configured to connect an upper left shoulder portion of the left reinforcing member and an upper right shoulder portion of the right reinforcing member, a left corner connecting member configured to connect the lower-side reinforcing member and the lower left arm portion of the left reinforcing member, and a right corner connecting member configured to connect the lower-side reinforcing member and the lower right arm portion of the right reinforcing member.

The reinforcing member is configured by connecting the left reinforcing member, the right reinforcing member, and the lower-side reinforcing member via the upper connecting member, the left corner connecting member, and the right corner connecting member, as described above. Thus, the reinforcing member is configured to cover the whole peripheral edge of the inner panel to suppress the deformation of the resin back door for a vehicle due to external factors, such as heat or external force.

In a method of manufacturing a resin back door for a vehicle according to the present disclosure, the resin back door includes a resin inner panel, a resin outer panel, and a metal reinforcing member arranged in a hollow space defined by the inner panel and the outer panel. The method includes an aligning step of aligning the reinforcing member with the inner panel leaving a gap, a sticking step of fixedly bonding the reinforcing member to the inner panel, and a correcting step of correcting an outer peripheral edge of the inner panel to a predetermined dimension. In the aligning step, while the outer peripheral edge of the inner panel is corrected to a predetermined dimension, the reinforcing member is aligned to the inner panel. In the sticking step, the reinforcing member is fixedly bonded to a position separated from the outer peripheral edge of the inner panel.

The reinforcing member is aligned with the inner panel leaving a gap, a dimensional variation of the reinforcing member and a dimensional variation of the inner panel are accommodated by the gap, and the reinforcing member is fixedly bonded to the inner panel in this state. Thus, the reinforcing member does not deform the inner panel during assembly, and the external dimensional accuracy can be improved while ensuring the strength of the resin back door. Furthermore, since the reinforcing member is fixedly bonded to the inner panel while the outer peripheral edge is corrected to a predetermined dimension, it is possible to further improve the external dimensional accuracy.

The method of manufacturing a resin back door for a vehicle may be configured so that the reinforcing member is formed by mutually connecting a plurality of divided reinforcing members separately fixed to the inner panel, via connecting members to form an annular shape along the outer peripheral edge of the inner panel, the divided reinforcing members and the connecting members are fastened with fasteners, and a fastener hole for fastening each of the divided reinforcing members to each of the connecting members has a size large enough to accommodate a variation in distance between the divided reinforcing members. The divided reinforcing member is aligned with the inner panel leaving a gap in the aligning step, the divided reinforcing member is fixedly bonded to the inner panel in the sticking step, and after the connecting member fixedly bonds the divided reinforcing member to the inner panel, the connecting member is fastened to the divided reinforcing member with each of the fasteners.

Therefore, when the connecting members are fastened to the divided reinforcing member, the inner panel is not deformed, and the strength of the resin back door for a vehicle can be improved while ensuring the external dimensional accuracy.

Advantageous Effects of Invention

According to an embodiment of the present disclosure, it is possible to improve external dimensional accuracy while ensuring the strength of a resin back door for a vehicle.

BRIEF DESCRIPTION OF DRAWINGS

Embodiment(s) of the present disclosure will be described by reference to the following figures, wherein.

DESCRIPTION OF EMBODIMENTS

Figure 1:
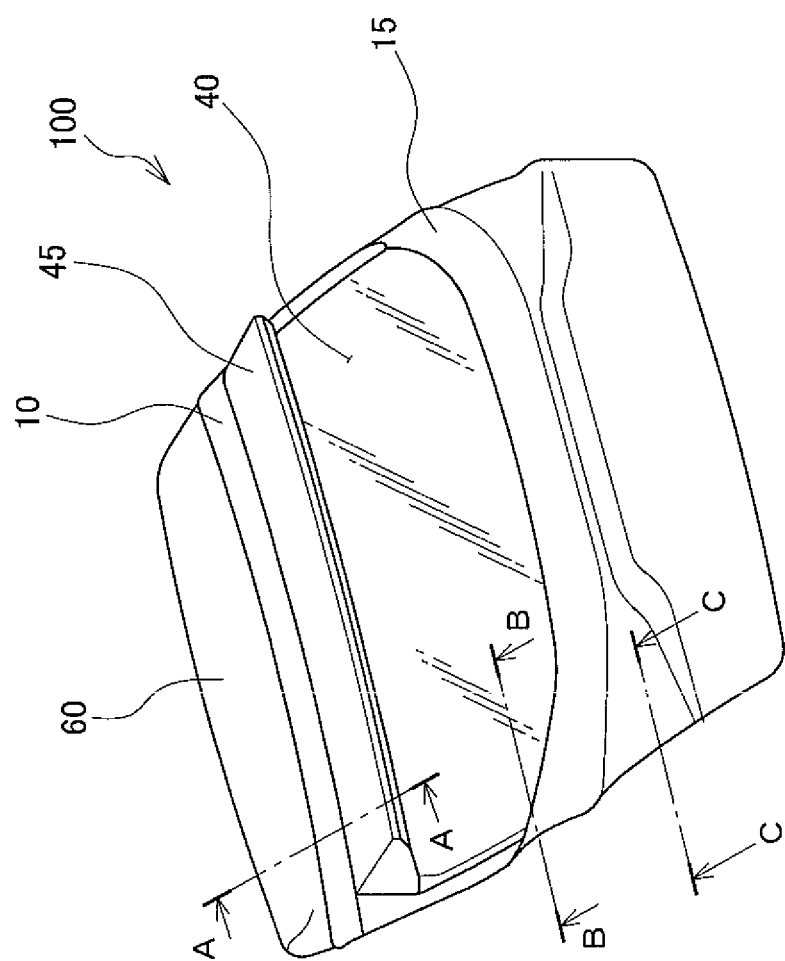
FIG. 1 is a perspective view of a resin back door according to an embodiment of the present disclosure.
Figure 1:
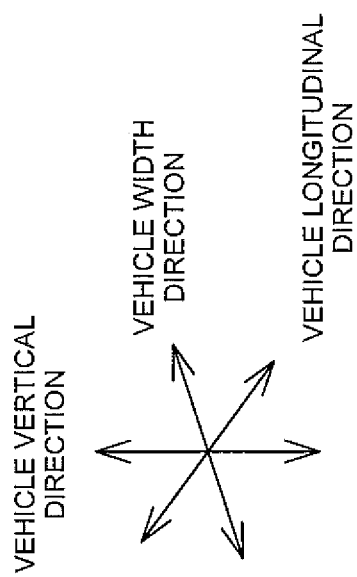
Figure 2:
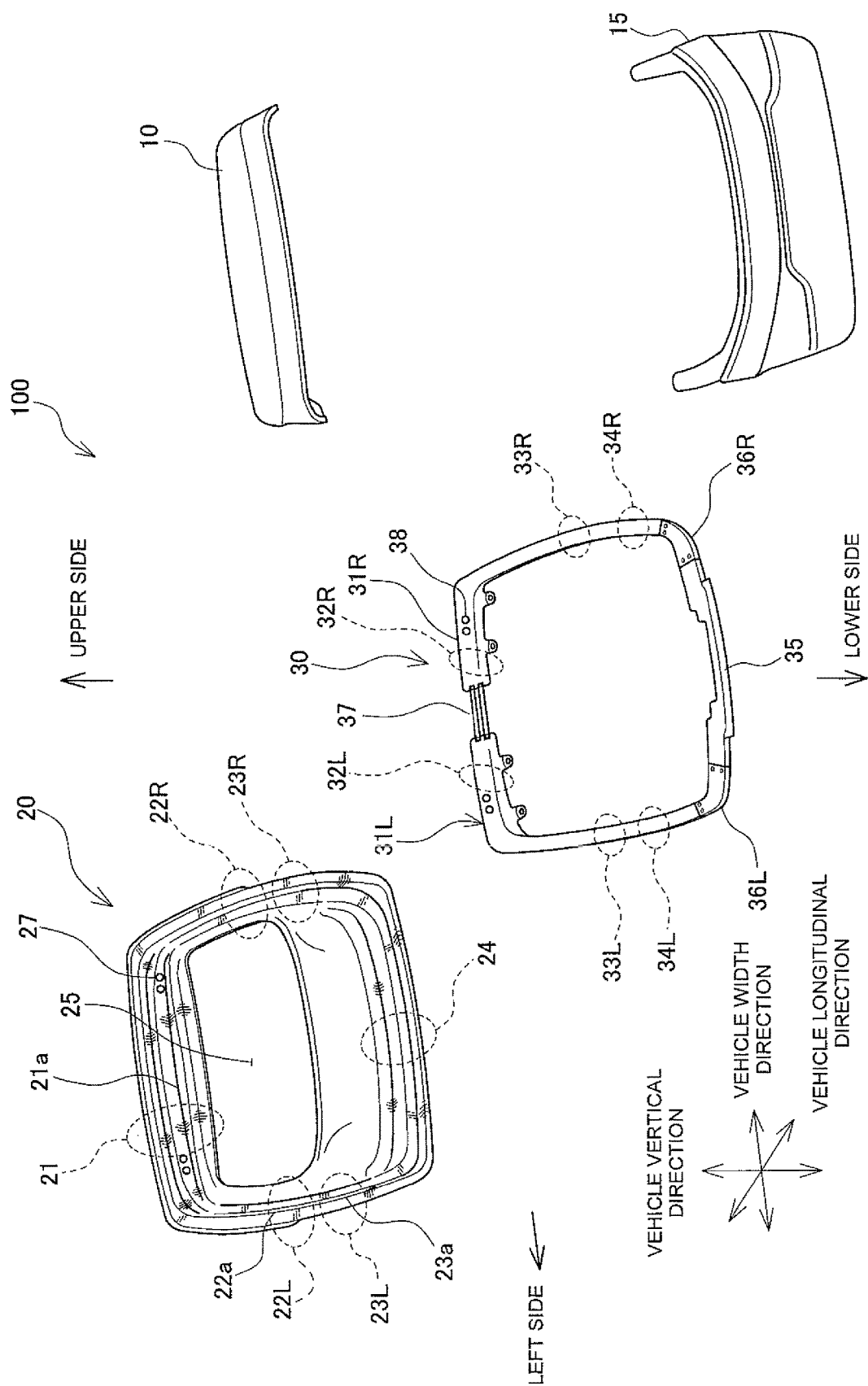
FIG. 2 is an exploded perspective view of the resin back door illustrated in FIG. 1.

Hereinafter, a resin back door 100 for a vehicle according to an embodiment will be described with reference to the drawings. The resin back door 100 for a vehicle includes a resin upper outer panel 10 and a lower outer panel 15, as illustrated in FIG. 1, and a resin inner panel 20 and a metal reinforcing member 30 fixed to the inner panel 20, as illustrated in FIG. 2. The right side and the left side are described as the right side and the left side as viewed from a rear side of the vehicle.

As illustrated in FIG. 2, an opening 25 for a back window is provided at the center of the inner panel 20, and groove portions 21a, 22a, and 23a to which the reinforcing member 30 is assembled are provided on an outer peripheral edge. The inner panel 20 includes an upper side portion 21 positioned above the opening 25 to which the upper outer panel 10 is assembled, a left side portion 22L and a right side portion 22R positioned on the outsides of the opening 25 in a vehicle width direction, to which an upper portion of the lower outer panel 15 is assembled, and a lower left portion 23L, a lower right portion 23R, and a lower side portion 24 positioned below the opening 25 to which the lower outer panel 15 is assembled.

As illustrated in FIG. 2, in the reinforcing member 30, a left reinforcing member 31L, a right reinforcing member 31R, and a lower-side reinforcing member 35 are connected via an upper connecting member 37, a left corner connecting member 36L, and a right corner connecting member 36R, and assembled into an integral structure of square annular shape. The left reinforcing member 31L and the right reinforcing member 31R have a substantially L-shape form. The left reinforcing member 31L has a substantially L-shape form extending along the upper side portion 21, the left side portion 22L, and the lower left portion 23L of the inner panel 20, and the right reinforcing member 31R has a substantially L-shape form extending along the upper side portion 21, the right side portion 22R, and the lower right portion 23R of the inner panel 20. The left reinforcing member 31L has an upper left shoulder portion 32L assembled so as to face the groove portion 21a of the upper side portion 21 of the inner panel 20, an upper left arm portion 33L assembled so as to face the groove portion 22a of the left side portion 22L of the inner panel 20, and a lower left arm portion 34L assembled so as to face the lower left portion 23L of the inner panel 20. The right reinforcing member 31R is symmetrical to the left reinforcing member 31L, and includes an upper right shoulder portion 32R, an upper right arm portion 33R, and a lower right arm portion 34R.

As illustrated in FIG. 1, a back door glass 40 is attached on the lower side of the upper outer panel 10 in a vehicle vertical direction. Furthermore, a resin spoiler 45 is attached to an upper end portion of the upper outer panel 10 in the vehicle vertical direction. As illustrated in FIG. 2, the resin back door 100 is mounted to a roof panel 60 with mounting hinges, not illustrated, fastened to hinge mounting holes 27 provided in the upper side portion 21 of the inner panel 20, and hinge mounting holes 38 provided in the upper left shoulder portion 32L of the left reinforcing member 31L and the upper right shoulder portion 32R of the right reinforcing member 31R.

Figure 3:
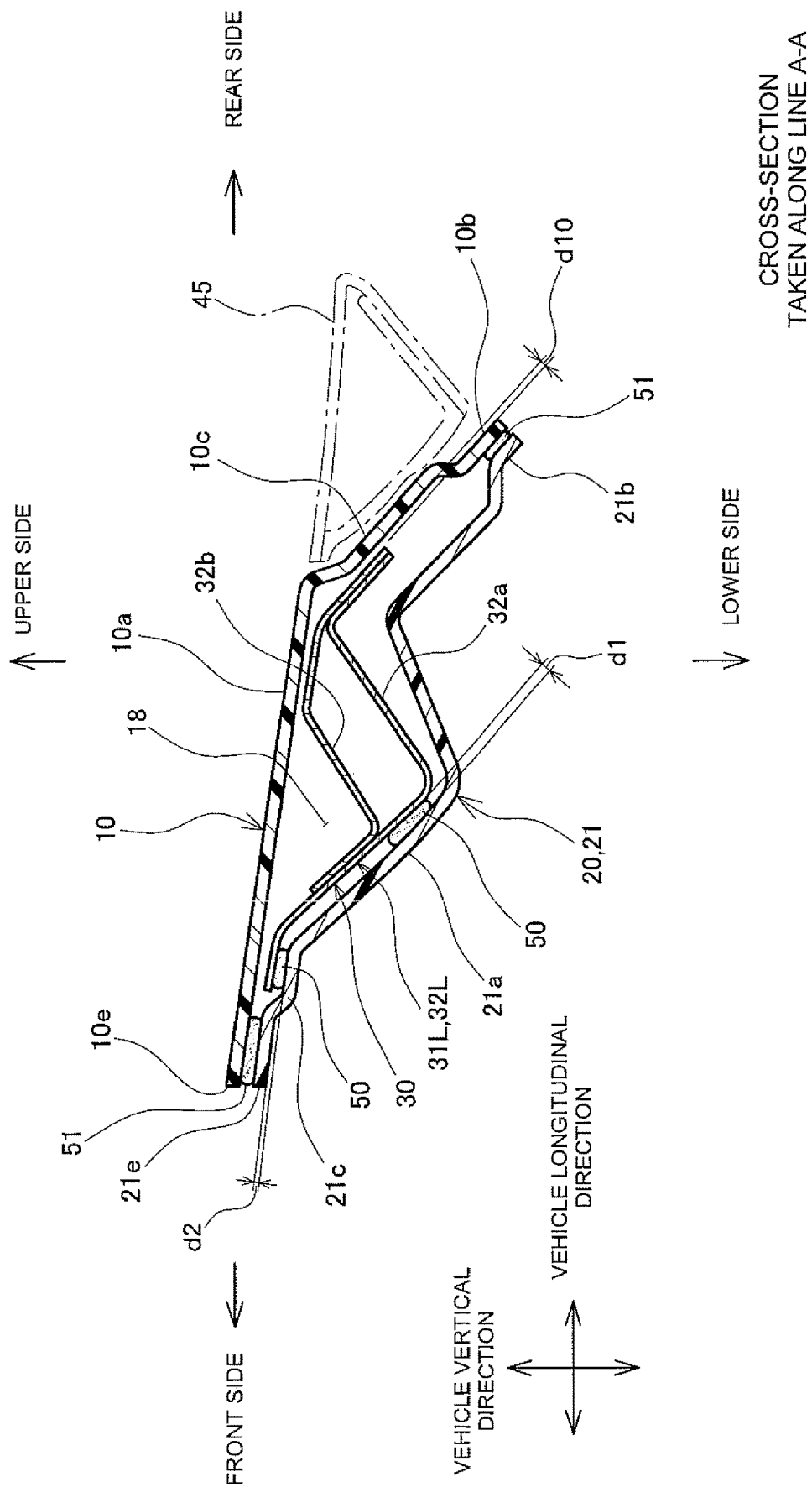
FIG. 3 is a cross-sectional view taken along line A-A illustrated in FIG. 1.

As illustrated in FIG. 3, the upper left shoulder portion 32L of the left reinforcing member 31L and the upper outer panel 10 are assembled on the left side of the upper side portion 21 of the inner panel 20. The upper side portion 21 of the inner panel 20 includes the groove portion 21a having a substantially V-shape recessed downward in the vehicle vertical direction, a flange 21c extending after bending in a vehicle longitudinal direction from the groove portion 21a, a parting portion 21e positioned on a front side of the vehicle, and an end portion 21b positioned on a rear side of the vehicle.

The upper outer panel 10 is protruded upward in a substantially V shape in a vehicle vertical direction, and includes a front portion 10a constituting a design surface, and a rear portion 10c to which the resin spoiler 45 is assembled. The front portion 10a has a front end 10e assembled to the parting portion 21e of the inner panel 20 with an adhesive 51 and the rear portion 10c has a rear end 10b assembled to the end portion 21b of the inner panel 20 with an adhesive 51. In this way, when the upper outer panel 10 having a substantially V-shape shape protruded upward is assembled to the inner panel 20 having a substantially V-shape form recessed downward, a hollow space 18 is formed inside thereof, and the upper left shoulder portion 32L of the left reinforcing member 31L is assembled in the hollow space 18.

The upper left shoulder portion 32L of the left reinforcing member 31L includes an inner plate 32a positioned near the inner panel 20 and substantially cranked, and an outer plate 32b positioned near the upper outer panel 10 and substantially cranked. The upper left shoulder portion 32L is formed by displacing the inner plate 32a and the outer plate 32b in the vehicle longitudinal direction so as to define a trapezoidal closed cross-section at the center, and performing friction stir welding (FSW) or spot-welding on both end portions of the inner plate 32a and the outer plate 32b. The inner plate 32a has a center portion arranged in the groove portion 21a of the inner panel 20 with a gap d1 and fixed therein with an adhesive 50, and the inner plate 32a has a front end portion in the vehicle longitudinal direction, arranged at the flange 21c of the inner panel 20 with a gap d2 and fixed thereto with the adhesive 50. A gap d10 is defined between the outer plate 32b and the front portion 10a and rear portion 10c of the upper outer panel 10.

Figure 4:
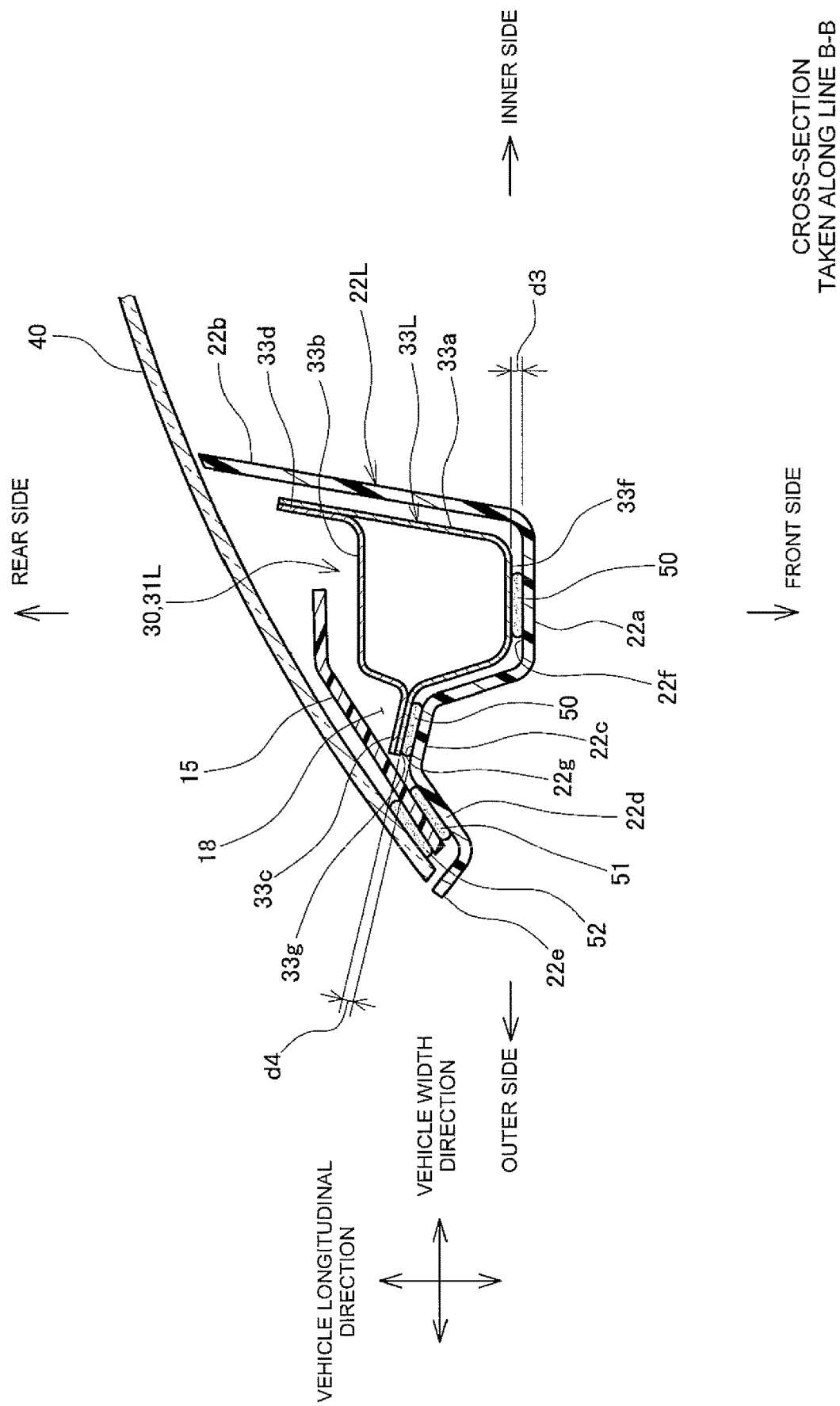
FIG. 4 is a cross-sectional view taken along line B-B illustrated in FIG. 1.

As illustrated in FIG. 4, the upper left arm portion 33L of the left reinforcing member 31L, the lower outer panel 15, and the back door glass 40 are assembled to the left side portion 22L of the inner panel 20. The left side portion 22L of the inner panel 20 includes the groove portion 22a having a substantially U-shape recessed to the front side in the vehicle longitudinal direction, and an inner flange 22c and an outer flange 22d which bend and extend to the outer side from the groove portion 22a in the vehicle width direction. The outer side of the outer flange 22d in the vehicle width direction is formed as a parting portion 22e positioned on the outer side in the vehicle width direction.

As illustrated in FIGS. 2 and 4, an upper portion of the lower outer panel 15 is assembled to the outer flange 22d of the left side portion 22L of the inner panel 20 with an adhesive 51 at strip-shaped portions each protruding upward on the outer side in the vehicle width direction, and an inner side portion of the lower outer panel 15 in the vehicle width direction extends to the inner side in the vehicle width direction to cover the groove portion 22a of the inner panel 20. The hollow space 18 is formed between the upper portion of the lower outer panel 15 and the groove portion 22a of the inner panel 20, and the upper left arm portion 33L of the left reinforcing member 31L is assembled in the hollow space 18.

The upper left arm portion 33L of the left reinforcing member 31L has a substantially square annular closed-section structure, and includes collar portions 33c and 33d projecting to the outer side in the vehicle width direction and to the rear side in a vehicle longitudinal direction, respectively. The upper left arm portion 33L of the left reinforcing member 31L includes an inner plate 33a and an outer plate 33b. The inner plate 33a is positioned near the inner panel 20 and includes collars having a substantially U-shape form extending to the outer side in the vehicle width direction and to the rear side in the vehicle longitudinal direction, and the outer plate 33b has a bending plate formed to close an opening side of the inner plate 33a of U-shape form and includes collars on both sides to be assembled to the collars of the inner plate 33a. Joint portions between the collars of the inner plate 33a and the collars of the outer plate 33b constitute the collar portions 33c and 33d, respectively. A surface 33f of a bottom portion of the inner plate 33a of the left reinforcing member 31L is arranged at a surface 22f of the groove portion 22a of the inner panel 20 leaving a gap d3 and is fixed thereto with the adhesive 50. A surface 33g of the collar portion 33c of the left reinforcing member 31L near the inner panel 20 is arranged at a surface 22g of the inner flange 22c of the inner panel 20 leaving a gap d4 and is fixed thereto with the adhesive 50. The outer plate 33b and the side outer panel 12 are separated from each other.

The lower outer panel 15 is assembled onto the outer flange 22d of the inner panel 20 via a urethane material 52, and the back door glass 40 is attached onto the rear side of the upper portion of the lower outer panel 15 in a vehicle longitudinal direction.

Figure 5:
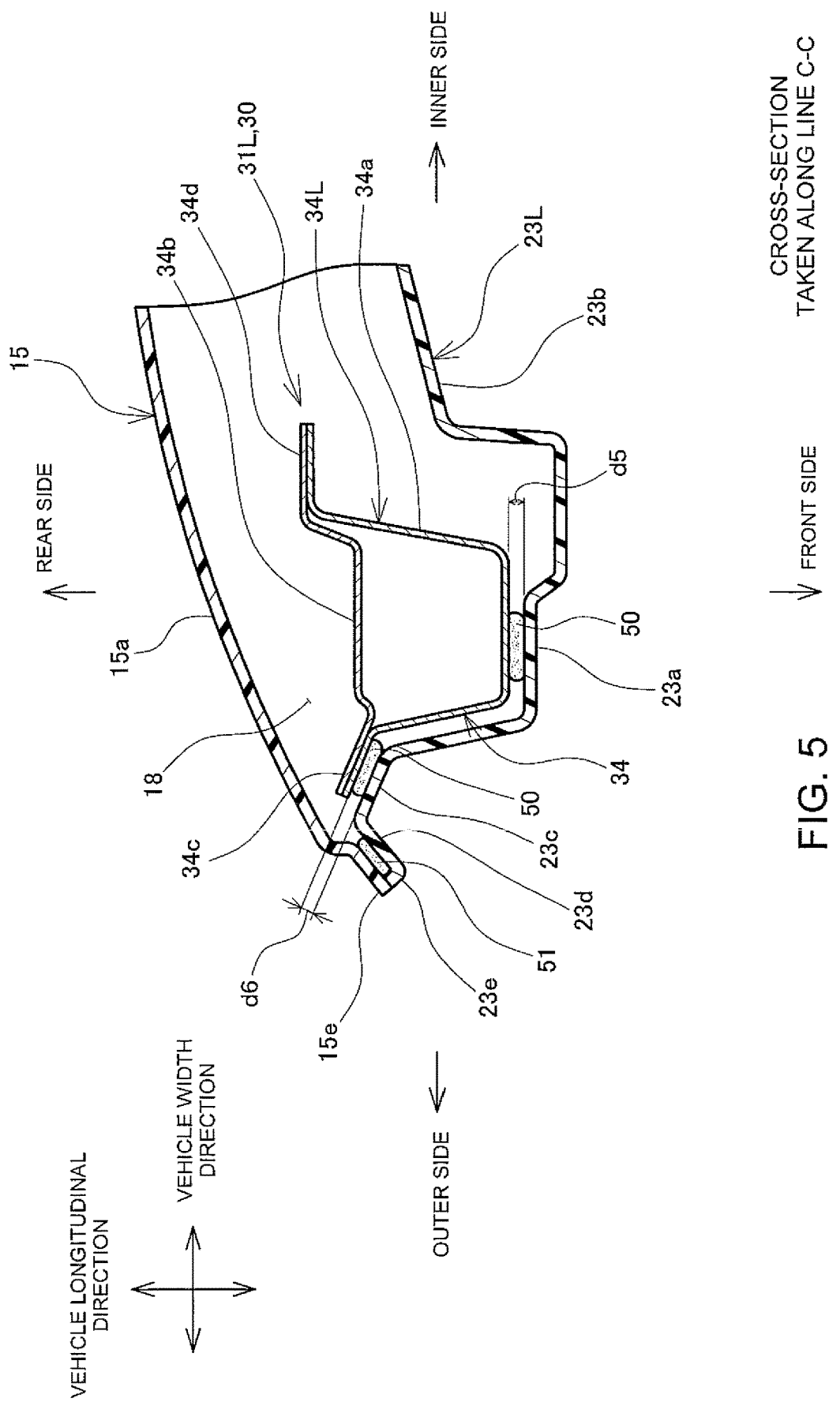
FIG. 5 is a cross-sectional view taken along line C-C illustrated in FIG. 1.

As illustrated in FIG. 5, the lower left arm portion 34L of the left reinforcing member 31L and the lower outer panel 15 are assembled to the lower left portion 23L of the inner panel 20. The lower left portion 23L of the inner panel 20 includes a groove portion 23a having a substantially U-shape recessed to the front side in a vehicle longitudinal direction, and an inner flange 23c and an outer flange 23d which bend and extend to the outer side from the groove portion 23a in the vehicle width direction. The outer side of the outer flange 23d in the vehicle width direction is formed as a parting portion 23e on the outer side in the vehicle width direction.

The lower outer panel 15 includes a center portion 15a curving to the rear side in a vehicle longitudinal direction to form a design surface, and an end portion 15e assembled to the outer flange 23d of the inner panel 20 with an adhesive 51. In this way, when the lower outer panel 15 curving to the rear side in the vehicle longitudinal direction is assembled to the inner panel 20 having a U-shape form recessed to the front side in the vehicle longitudinal direction, a hollow space 18 is formed therein, and the lower left arm portion 34L of the left reinforcing member 31L is assembled in the hollow space 18.

The lower left arm portion 34L of the left reinforcing member 31L has a substantially square annular closed-section structure, and includes collar portions 34c and 34d protruding to the outer side in the vehicle width direction and to the inner side in the vehicle width direction, respectively. The lower left arm portion 34L of the left reinforcing member 31L includes an inner plate 34a and an outer plate 34b. The inner plate 34a is positioned near the inner panel 20 and includes collars having a substantially U shape extending to the outer side in the vehicle width direction and to the inner side in the vehicle width direction, and the outer plate 34b has a plate member for closing an opening side of the inner plate 34a of U shape and includes collars on both sides to be assembled to the collars on both sides of the inner plate 34a. Joint portions between the collars of the inner plate 34a and the collars of the outer plate 34b constitute the collar portions 34c and 34d, respectively. A bottom portion of the inner plate 34a of the left reinforcing member 31L is arranged in the groove portion 23a of the inner panel 20 leaving a gap d5 and is fixed therein with the adhesive 50. A surface of the collar portion 34c of the left reinforcing member 31L near the inner panel 20 is arranged at the inner flange 23c of the inner panel 20 leaving a gap d6 and is fixed thereto with the adhesive 50. A gap is defined between the outer plate 34b and the lower outer panel 15.

As illustrated in FIG. 2, the upper connecting member 37 is a strip-shaped member for connecting the upper left shoulder portion 32L of the left reinforcing member 31L and the upper right shoulder portion 32R of the right reinforcing member 31R in the vehicle width direction. When the resin back door 100 thermally deforms due to temperature rise, the upper connecting member 37 prevents the upper left shoulder portion 32L of the left reinforcing member 31L and the upper right shoulder portion 32R of the right reinforcing member 31R from deforming; that is, from opening in the vehicle width direction.

As illustrated in FIG. 2, the left corner connecting member 36L is a substantially L-shaped member for connecting a lower end portion of the left reinforcing member 31L and a left end of the lower-side reinforcing member 35. The right corner connecting member 36R is a substantially L-shaped member for connecting a lower end portion of the right reinforcing member 31R and a right end of the lower-side reinforcing member 35. The left and right reinforcing members 31L and 31R are connected to the lower-side reinforcing member 35 with the left corner connecting member 36L and the right corner connecting member 36R. Therefore, deformation of the resin back door 100 can be suppressed when an object is caught at a lower end of the resin back door 100.

In the reinforcing member 30, the left reinforcing member 31L and the right reinforcing member 31R, which have a substantially L shape, and the lower-side reinforcing member 35 are connected by the upper connecting member 37, the left corner connecting member 36L, and the right corner connecting member 36R, and assembled into an integral structure of square annular shape. Therefore, the reinforcing member 30 covers the whole peripheral edge of the inner panel 20, and suppresses deformation of the resin back door 100 due to an external factor, such as heat or external force.

Figure 6:
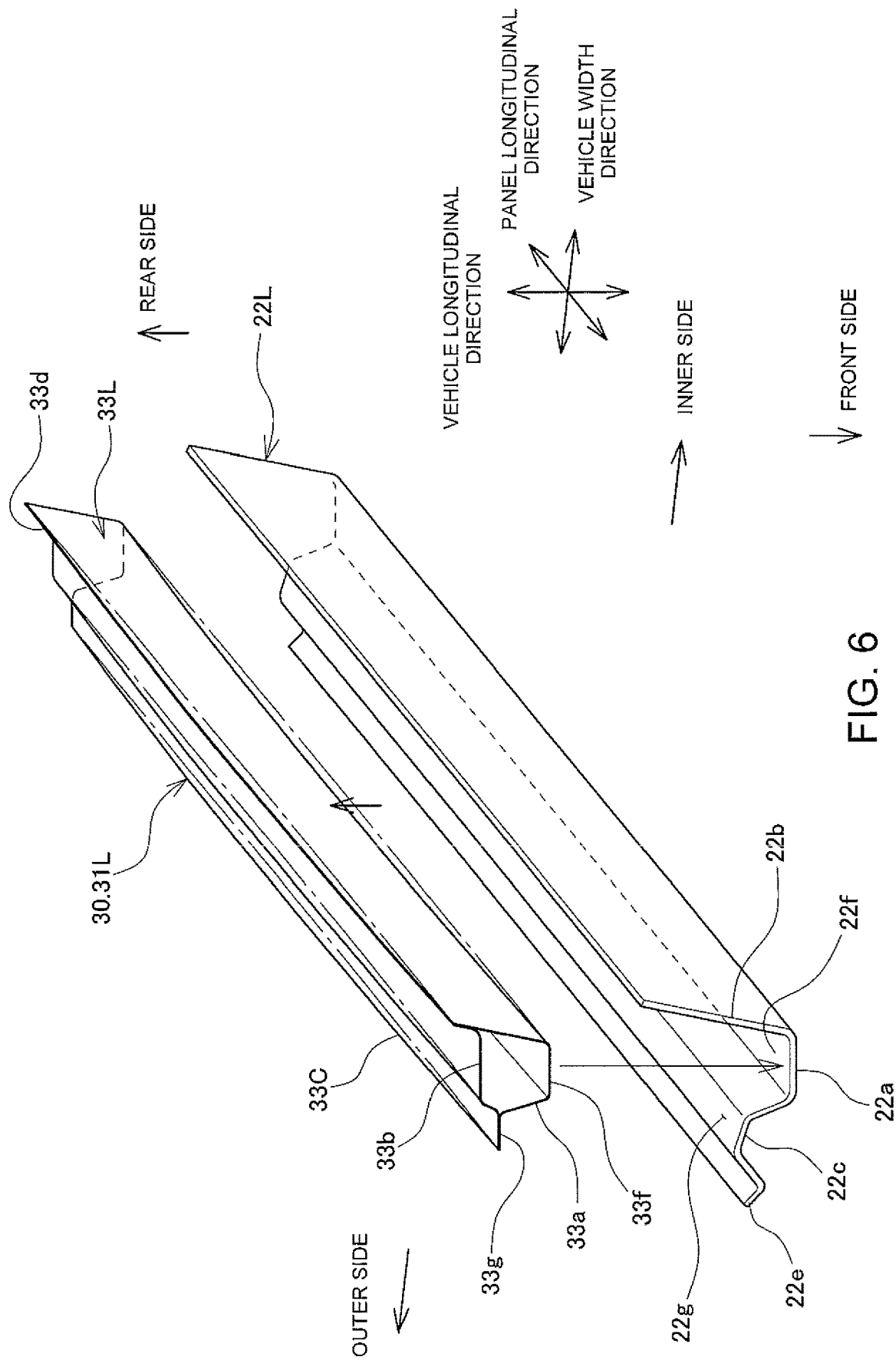
FIG. 6 is a perspective view illustrating assembly of an inner panel and a reinforcing member.

Variation in gaps between the inner panel 20 and the reinforcing member 30 of the resin back door 100 configured as described above and a manufacturing method of the resin back door 100 will be described with reference to FIGS. 6 to 8. Hereinafter, variation in gaps between the left side portion 22L of the inner panel 20 and the upper left arm portion 33L of the left reinforcing member 31L will be described. In the following description, as illustrated in FIG. 6, the left side portion 22L of the inner panel 20 is finished according to a designed shape, but the upper left arm portion 33L slightly curves to the rear side in a vehicle longitudinal direction, relative to the designed shape indicated by a dashed-dotted line. A shift from design dimensions due to curving is within manufacturing tolerance. Furthermore, in the following description, the left side portion 22L of the inner panel 20 and the upper left arm portion 33L of the left reinforcing member 31L are fixed to a lower jig 70 and an upper jig 80, respectively, a gap between the surface 33f of the upper left arm portion 33L and the surface 22f of the inner panel 20 is set to be a reference gap ds, and the adhesive 50 is filled in the gap to fix the upper left arm portion 33L of the left reinforcing member 31L to the left side portion 22L of the inner panel 20.

Figure 7:
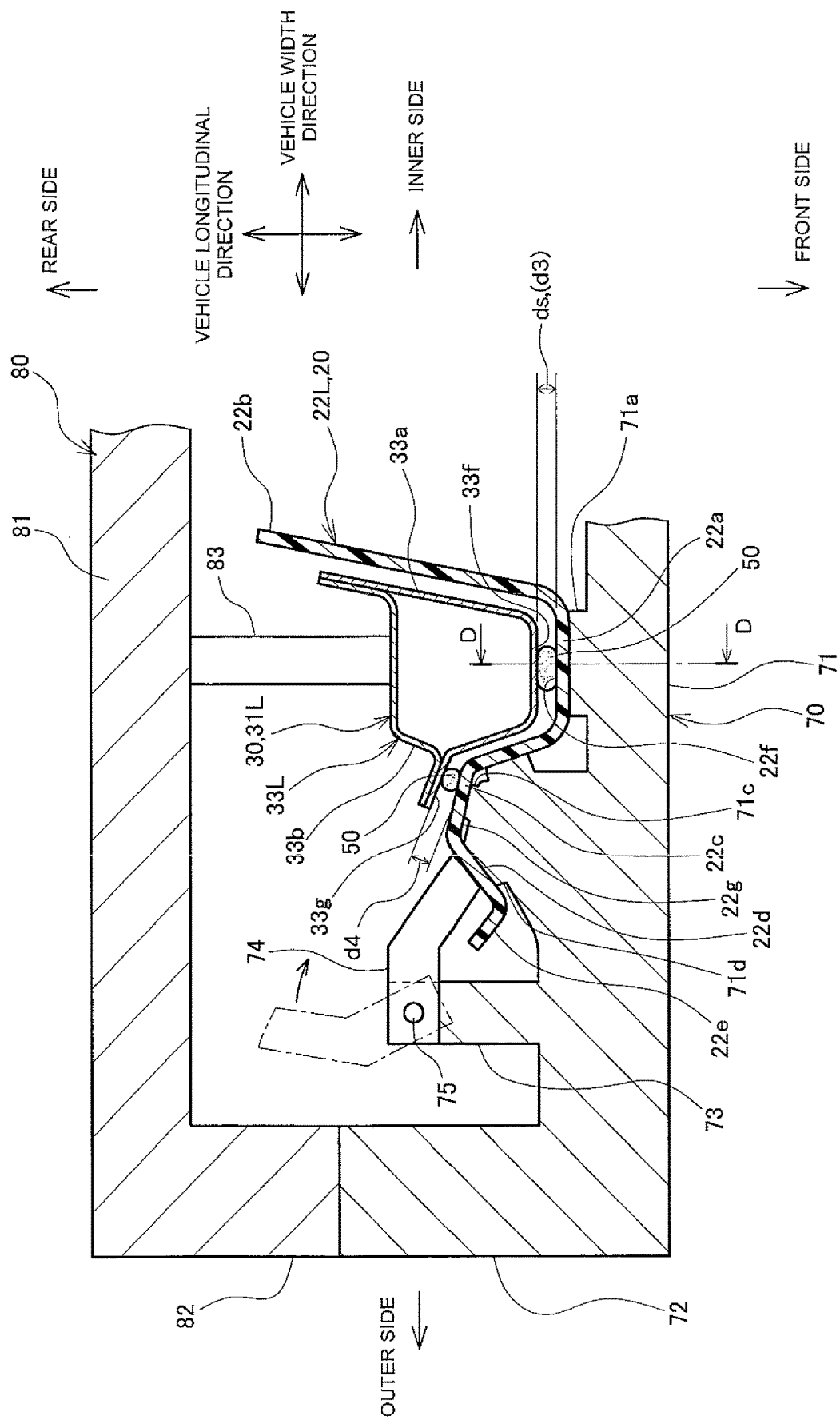
FIG. 7 is a cross-sectional view illustrating a reinforcing member being fixed to an upper jig assembled to an inner panel fixed to a lower jig.

As illustrated in FIG. 7, the left side portion 22L of the inner panel 20 is fixed to the lower jig 70. As illustrated in FIG. 7, the lower jig 70 includes a main body 71, a base 72 provided around the main body 71 to receive the upper jig 80, and a turning clamp 74 for holding the outer flange 22d of the left side portion 22L of the inner panel 20 onto the main body 71. The main body 71 includes bases 71a, 71c, and 71d for receiving the groove portion 22a, the inner flange 22c, and the outer flange 22d of the left side portion 22L of the inner panel 20, and a post 73 to which the turning clamp 74 is mounted. The groove portion 22a, the inner flange 22c, and the outer flange 22d are placed on the bases 71a, 71c, and 71d of the main body 71 of the lower jig 70, respectively, the turning clamp 74 is turned to hold the outer flange 22d onto the main body 71 of the lower jig 70, and the left side portion 22L of the inner panel 20 is fixed to the lower jig 70.

The upper jig 80 includes a main body 81, an arm 82 placed on the base 72 of the lower jig 70, and a bracket 83 for holding the upper left arm portion 33L of the left reinforcing member 31L. As illustrated in FIG. 7, when a lower surface of the arm 82 is set on an upper surface of the base 72 of the lower jig 70 while the upper left arm portion 33L of the left reinforcing member 31L is held by the bracket 83, a gap between the surface 33f of the upper left arm portion 33L and the surface 22f of the inner panel 20 is set to the reference gap ds (aligning step).

Here, the gap d3 between the surface 33f of the upper left arm portion 33L and the surface 22f of the inner panel 20 illustrated in FIG. 4 varies by ±ed3 indicated by the following Formula 1, where a manufacturing tolerance defining a dimensional variation of the reinforcing member 30 is e30, a manufacturing tolerance defining a dimensional variation of the inner panel 20 is e20, a dimensional variation in assembling for assembling the reinforcing member 30 to the inner panel 20 is ea, a mounting error between the upper jig 80 and the reinforcing member 30 is e80, and a mounting error between the lower jig 70 and the inner panel 20 is e70.

$$\pm ed3 = [\sqrt{(|e20|^2 + |e30|^2 + |ea|^2)}] + e80 + e70 \qquad \text{(Formula 1)}$$

Even though the gap d3 between the surface 33f of the upper left arm portion 33L and the surface 22f of the inner panel 20 illustrated in FIG. 4 varies by ±ed3 as indicated by Formula 1, the reference gap ds is set in accordance with the following formula 2 to leave a gap not less than a minimum gap dmin.

$$ds = ed3 + dmin \qquad \text{(Formula 2)}$$

Figure 8:
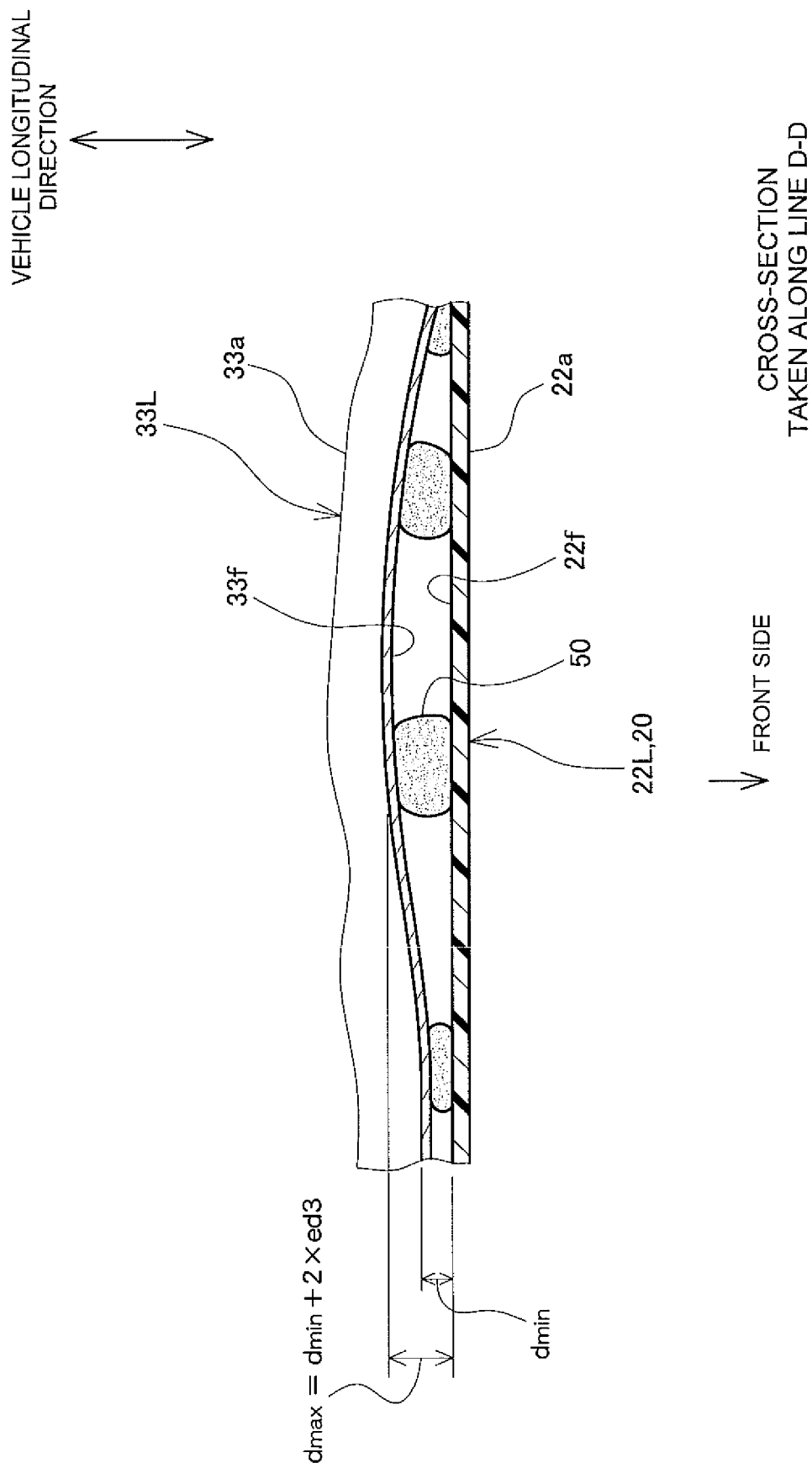
FIG. 8 is a cross-sectional view illustrating a longitudinal change between a groove portion of an inner panel and a reinforcing member in a gap in a vehicle width direction.

In this case, the gap d3 between the surface 33f of the upper left arm portion 33L and the surface 22f of the inner panel 20 illustrated in FIG. 4 varies between dmin and dmax=dmin +2*ed3, as illustrated in FIG. 8.

Since the left side portion 22L of the inner panel 20 is finished according to the design dimensions, the surface 22f of the groove portion 22a positioned on the rear side in a vehicle longitudinal direction is formed into a horizontal linear surface. In contrast, since the upper left arm portion 33L of the left reinforcing member 31L slightly curves to the rear side in a vehicle longitudinal direction, the front surface 33f of the upper left arm portion 33L positioned on the front side in the vehicle longitudinal direction, opposed to the surface 22f of the groove portion has a surface curving to the rear side in the vehicle longitudinal direction. Therefore, the gap between the surface 22f and the surface 33f has a width varying between a small width dmin at an end portion and a large width dmax at the center portion. Then, the adhesive 50 is filled in the gap d3 varying between dmin and dmax, fixedly bonding the reinforcing member 30 to the inner panel 20 (sticking step).

When the adhesive 50 is solidified, the adhesive forms an adhesive layer having a thickness varying according to the width of the gap d3. The gap d4 between the surface 33g of the collar portion 33c of the left reinforcing member 31L positioned near the inner panel 20 and the surface 22g of the inner flange 22c of the inner panel 20 also varies between dmin and dmax, as in the case of the gap d3. The adhesive 50 is also filled in the gap d4 to fixedly bond the reinforcing member 30 to the inner panel 20.

As described above, in the resin back door according to the present embodiment, the reinforcing member 30 is attached to the upper jig 80 to be set to be spaced apart from the inner panel 20 so as to leave a gap not less than the minimum gap dmin between the surfaces 33f and 33g of the upper left arm portion 33L and the surfaces 22f and 22g of the inner panel 20 (aligning step), and the adhesive 50 is filled in the gap to fixedly bond the reinforcing member 30 to the inner panel 20 (sticking step). Since the thickness of the adhesive layer of the solidified adhesive 50 varies according to the width of the gap, the resin inner panel 20 is not pulled and deformed by the reinforcing member 30 fixedly bonded to the inner panel 20.

As illustrated in FIG. 7, the reinforcing member 30 is fixedly bonded to the surfaces 22f and 22g which are separated from the parting portion 22e being the outer peripheral edge of the inner panel 20. Therefore, even though a dimensional variation within the range of a manufacturing tolerance is in the inner panel 20, the reinforcing member 30 is fixedly bonded by fixing the outer flange 22d of the inner panel 20 to the main body 71 of the lower jig 70 with the turning clamp 74 and correcting the position of the parting portion 22e to the design dimensions (correcting step).

That is, when the inner panel 20 is not finished into the design dimensions, the outer flange 22d of the inner panel 20 is fixed to the main body 71 of the lower jig 70 with the turning clamp 74 to correct the parting portion 22e to predetermined design dimensions, as illustrated in FIG. 7 (correcting step). The reinforcing member 30 is attached to a support member, such as a jig, while the position of the parting portion 22e is held at a position according to the design dimensions so that the reinforcing member 30 is spaced from the inner panel 20 and a gap not less than the minimum gap dmin is left between the reinforcing member 30 and the inner panel 20. Then, the adhesive 50 is filled in the gap to fix the reinforcing member 30. In this case, the external dimension of the resin inner panel 20 is not pulled and deformed by the reinforcing member 30 fixedly bonded to the inner panel 20. Moreover, due to the strength of the reinforcing member 30, the position of the parting portion 22e of the inner panel 20 is held in the design shape. Therefore, the external dimensional accuracy can be further improved.

As described above, the resin back door 100 according to the present embodiment accommodates a dimensional variation of the reinforcing member 30 and a dimensional variation of the inner panel 20 by variation in widths of the gaps, and the reinforcing member 30 is stuck to the inner panel 20. Thus, it is possible to improve the external dimensional accuracy of the resin back door 100 while ensuring the strength thereof.

In the above explanation, the reinforcing member 30 is set to be spaced apart from the inner panel 20 (aligning step), and then the adhesive 50 is filled in the gap to fixedly bond the reinforcing member 30 to the inner panel 20 (sticking step). However, the reinforcing member 30 may be fixedly bonded to the inner panel 20 after the adhesive is applied to one or both of the reinforcing member 30 and the inner panel 20 and then the reinforcing member 30 is set to be spaced apart from the inner panel 20.

Figure 9:
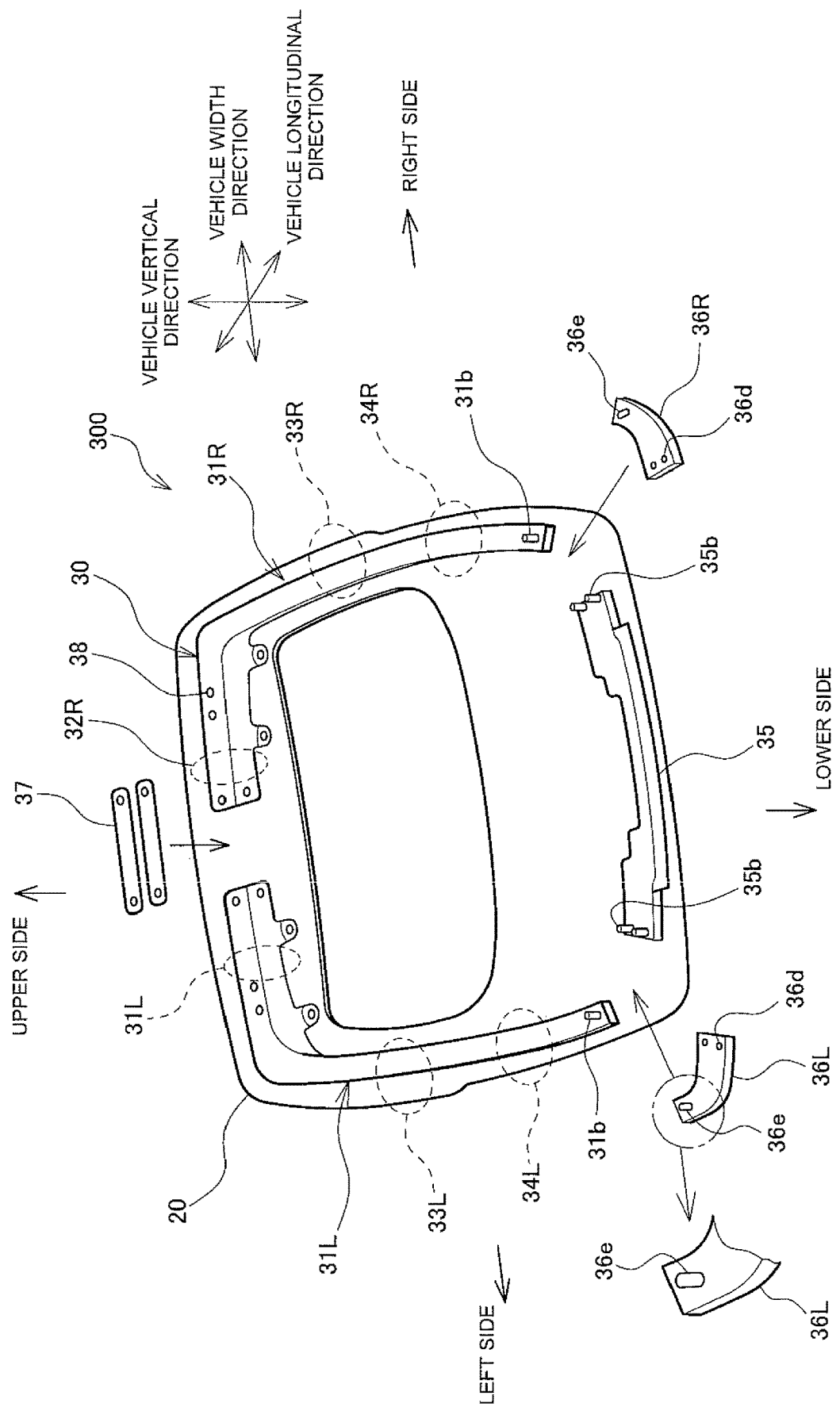
FIG. 9 is an exploded perspective view of a reinforcing member of a resin back door according to another embodiment of the present disclosure.

Next, a resin back door 300 according to another embodiment will be described with reference to FIG. 9. The same portions as those described above with reference to FIGS. 1 to 8 are denoted by the same reference numerals, and description thereof is omitted. In the resin back door 300 according to the present embodiment, the left reinforcing member 31L, the right reinforcing member 31R, and the lower-side reinforcing member 35, which are divided reinforcing members, separated from each other are fixedly bonded to the inner panel 20. Then, the divided reinforcing members are connected via the upper connecting member 37, the left corner connecting member 36L, and the right corner connecting member 36R, which are the connecting members, to form a square annular reinforcing member 30.

As in the resin back door 100 described above, the upper connecting member 37 is a strip-shaped member fastened to the upper left shoulder portion 32L of the left reinforcing member 31L and the upper right shoulder portion 32R of the right reinforcing member 31R to connect the left reinforcing member 31L and the right reinforcing member 31R in a vehicle width direction. The upper connecting member 37 is fastened to the left reinforcing member 31L and the right reinforcing member 31R with bolts and nuts which are unillustrated fasteners. When the resin back door 300 thermally deforms due to temperature rise, the upper connecting member 37 prevents the upper left shoulder portion 32L of the left reinforcing member 31L and the upper right shoulder portion 32R of the right reinforcing member 31R from deforming; that is, from opening in the vehicle width direction. For this reason, the upper connecting member 37 is formed into a strip-shaped member opposing only a pulling force and transmitting no bending moment and no torsional moment.

The left corner connecting member 36L is a substantially L-shaped member for connecting the lower end portion of the left reinforcing member 31L and the left end of the lower-side reinforcing member 35 to each other. An elongated hole 36e being a fastener hole, through which a bolt 31b being a fastener member fixed to the lower end portion of the left reinforcing member 31L passes, is provided at an end portion of the left corner connecting member 36L near the left reinforcing member 31L, and holes 36d for fastener members through which bolts 35b being the fastener members fixed to the left end of the lower-side reinforcing member 35 pass are provided at an end portion near the lower-side reinforcing member 35. The elongated hole 36e is an elongated hole extending in a direction in which the left reinforcing member 31L extends. Furthermore, each of the holes 36d has a size obtained by adding a gap to the diameter of a bolt 35b so that a gap is defined between the hole 36d and the bolt 35b. The right corner connecting member 36R is a substantially L-shaped member for connecting the lower end portion of the right reinforcing member 31R and the right end of the lower-side reinforcing member 35. As in the right corner connecting member 36R, an elongated hole 36*e* and holes 36*d* are provided.

The left corner connecting member 36L is fastened to the lower end portion of the left reinforcing member 31L and the left end of the lower-side reinforcing member 35 with the bolts 31*b* and 35*b* passed through the elongated hole 36*e* and the holes 36*d* and tightened with nuts not shown. Likewise, the right corner-connecting member 36R is fastened to the lower end portion of the right reinforcing member 31R and the right end of the lower-side reinforcing member 35 with the bolts 31*b* and 35*b* passed through an elongated hole 36*e* and holes 36*d* and tightened with nuts not shown. As a result of connection of the left and right reinforcing members 31L and 31R and the lower-side reinforcing member 35 in this manner, deformation of the resin back door 300 can be suppressed when an object is caught at a lower end of the resin back door 300.

As in the resin back door 100, the resin back door 300 is configured to accommodate a dimensional variation of the reinforcing member 30 and a dimensional variation of the inner panel 20 by variation in widths of the gaps, and the reinforcing member 30 is stuck to the inner panel 20. Therefore, after the reinforcing members 31L, 31R, and 35 separated from each other are fixedly bonded to the inner panel 20, the distance between the lower end portion of the left reinforcing member 31L and the left end of the lower-side reinforcing member 35 or the distance between the lower end portion of the right reinforcing member 31R and the right end of the lower-side reinforcing member 35 changes depending on the dimensional variation of the left and right reinforcing members 31L and 31R or the lower-side reinforcing member 35.

The elongated hole 36*e* and the hole 36*d* have a size large enough to accommodate a variation in distance between the reinforcing members 31L, 31R, and 35. Thus, the inner panel 20 is not deformed when the left corner connecting member 36L is fastened to the lower end portion of the left reinforcing member 31L and the left end of the lower-side reinforcing member 35. Therefore, it is possible to improve external dimensional accuracy while ensuring the strength of the resin back door. The same applies to the right corner-connecting member 36R.

Furthermore, in the reinforcing member 30, the left reinforcing member 31L, the right reinforcing member 31R, and the lower-side reinforcing member 35, which are separated from each other, are connected via the upper connecting member 37, the left corner connecting member 36L, and the right corner connecting member 36R into a square annular shape. Thus, as in the resin back door 100 described above with reference to FIGS. 1 to 8, the reinforcing member 30 covers the whole peripheral edge of the inner panel 20, and suppresses deformation of the resin back door 300 due to an external factor.

Furthermore, each of the reinforcing members 31L, 31R, and 35 has a size smaller than that of the reinforcing member 30 of the resin back door 100, assembled into a square annular integrated structure described with reference to FIGS. 1 to 8. Thus, absolute values of deviation from the design dimensions of the reinforcing members 31L, 31R, and 35 are reduced. Therefore, a variation in assembly is reduced, and the external dimensional accuracy of the resin back door 200 is further improved.

The invention claimed is:

1. A resin back door for a vehicle comprising:
   a resin inner panel;
   a resin outer panel; and
   a metal reinforcing member disposed in a hollow space defined by the inner panel and the outer panel,
   wherein the reinforcing member has an annular shape extending along an outer peripheral edge of the inner panel and includes a plurality of divided reinforcing members separated from each other and fixed to the inner panel with an adhesive leaving a gap, and the reinforcing member is constituted by connecting the divided reinforcing members via using connecting members.

2. The resin back door for the vehicle according to claim 1, wherein
   the divided reinforcing members and the connecting members are fastened with fasteners, and
   a fastener hole defined between each of the divided reinforcing members and each of the connecting members may have a size large enough to accommodate a variation in distance between divided reinforcing members.

3. The resin back door for the vehicle according to claim 2, wherein
   the divided reinforcing member includes:
   a left reinforcing member of substantially L shape disposed along an upper side portion, a left side portion, and a lower left portion of the inner panel and including an upper left shoulder portion opposed to the upper side portion and a lower left arm portion opposed to the lower left portion;
   a right reinforcing member of substantially L shape disposed along the upper side portion, a right side portion, and a lower right portion of the inner panel and including an upper right shoulder portion opposed to the upper side portion and a lower right arm portion opposed to the lower right portion; and
   a lower-side reinforcing member disposed at a lower side portion of the inner panel, and
   the connecting member includes:
   an upper connecting member configured to connect an upper left shoulder portion of the left reinforcing member and an upper right shoulder portion of the right reinforcing member;
   a left corner connecting member configured to connect the lower-side reinforcing member and the lower left arm portion of the left reinforcing member; and
   a right corner connecting member configured to connect the lower-side reinforcing member and the lower right arm portion of the right reinforcing member.

4. A method of manufacturing a resin back door for a vehicle, the resin back door including:
   a resin inner panel;
   a resin outer panel; and
   a metal reinforcing member arranged in a hollow space defined by the inner panel and the outer panel, the method comprising:
   aligning the reinforcing member with the inner panel leaving a gap;
   sticking the reinforcing member fixedly to the inner panel; and
   correcting an outer peripheral edge of the inner panel to a predetermined dimension,
   wherein, in the aligning, while the outer peripheral edge of the inner panel is corrected to a predetermined dimension, the reinforcing member is fitted to the inner panel, and
   in the sticking, the reinforcing member is fixedly bonded to a position separated from the outer peripheral edge of the inner panel.

5. The method of manufacturing a resin back door for the vehicle according to claim 4, wherein
the reinforcing member is formed by mutually connecting a plurality of divided reinforcing members separately fixed to the inner panel, via connecting members to form an annular shape along the outer peripheral edge of the inner panel,
the divided reinforcing members and the connecting members are fastened with fasteners,
a fastener hole for fastening each of the divided reinforcing members to each of the connecting member has a size large enough to accommodate a variation in distance between the divided reinforcing members,
the divided reinforcing member is aligned with the inner panel leaving a gap in the aligning,
the divided reinforcing member is fixedly bonded to the inner panel in the sticking, and
after the connecting member fixedly bonds the divided reinforcing member to the inner panel, the connecting member is fastened to the divided reinforcing member with each of the fasteners.

* * * * *